(12) United States Patent
Larson

(10) Patent No.: US 9,867,024 B1
(45) Date of Patent: Jan. 9, 2018

(54) TWO-WAY RADIO HARVESTER AND TRANSMITTER

(71) Applicant: Honeywell International Inc., Morris Plains, NJ (US)

(72) Inventor: Christian Larson, Golden Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/346,508

(22) Filed: Nov. 8, 2016

(51) Int. Cl.
*H04W 4/02* (2009.01)
*H04W 4/22* (2009.01)
*H04B 1/40* (2015.01)
*H01Q 1/24* (2006.01)

(52) U.S. Cl.
CPC ............... *H04W 4/22* (2013.01); *H01Q 1/24* (2013.01); *H04B 1/40* (2013.01)

(58) Field of Classification Search
CPC .............. H04W 4/22; H04B 1/40; H01Q 1/24
See application file for complete search history.

(56) References Cited

U.S. PATENT DOCUMENTS

| | | | | |
|---|---|---|---|---|
| 2005/0017602 A1* | 1/2005 | Arms | ................ | B60C 23/0411 310/339 |
| 2009/0117872 A1* | 5/2009 | Jorgenson | .......... | G06K 19/0713 455/334 |
| 2012/0255349 A1* | 10/2012 | Pop | ..................... | B60C 23/0413 73/146.5 |
| 2012/0256492 A1* | 10/2012 | Song | ....................... | H02J 1/102 307/66 |
| 2013/0328416 A1* | 12/2013 | Whitworth | .............. | H02J 50/30 307/149 |
| 2014/0247020 A1* | 9/2014 | Stankovic | ................. | A61F 2/10 320/166 |
| 2015/0128733 A1* | 5/2015 | Taylor | ..................... | H02J 7/025 73/865.8 |
| 2015/0236551 A1* | 8/2015 | Shearer | ................... | H02J 17/00 307/104 |
| 2016/0016096 A1* | 1/2016 | Fisher | ................ | G05B 19/0421 700/90 |
| 2016/0134150 A1* | 5/2016 | Chen | ....................... | H02J 50/20 320/108 |

* cited by examiner

*Primary Examiner* — Khai M Nguyen
(74) *Attorney, Agent, or Firm* — Brooks, Cameron & Huebsch, PLLC

(57) ABSTRACT

Devices, methods, systems, and computer-readable media for a two-way radio harvester and transmitter are described herein. One or more embodiments include a two-way radio harvester and transmitter comprising a rectifier connected between a receive element and a storage element to harvest and convert a signal into direct current (DC) power and store the DC power, a gate coupled to the storage element and a controller to allow the DC power in the storage element to power the controller when the gate reaches a power threshold and closes, and a transmitter connected between the controller and a transmit element to convert data containing information about preselected items by the controller into radio frequency (RF) signals to be transmitted by the transmit element.

19 Claims, 2 Drawing Sheets

1

TWO-WAY RADIO HARVESTER AND TRANSMITTER

TECHNICAL FIELD

The present disclosure relates to methods, devices, systems, and computer-readable media for a two-way radio harvester and transmitter.

BACKGROUND

In emergency situations most emergency personnel carry a two-way radio for communication, for example with other members of their responding group (e.g., firefighters on a particular truck, from a particular station, or emergency personnel generally on site fighting a fire or providing other assistance). For instance, emergency personnel may also be communicating with members of other groups (e.g., firefighters communicating with paramedics and/or police officers).

Sometimes two-way radios aren't able to transmit messages reliably due to the frequency band being clogged or overrun by too many users competing to utilize the same frequency band at the same time. In such situations, it may be difficult to ascertain the status of an emergency worker, such as whether they are in a room with fire or are under some type of stress (e.g., in a hot environment, injured, trapped, carrying an injured person, etc.). This information may be difficult to receive if the channel for communication is clogged with other users.

DETAILED DESCRIPTION

Figure 1:
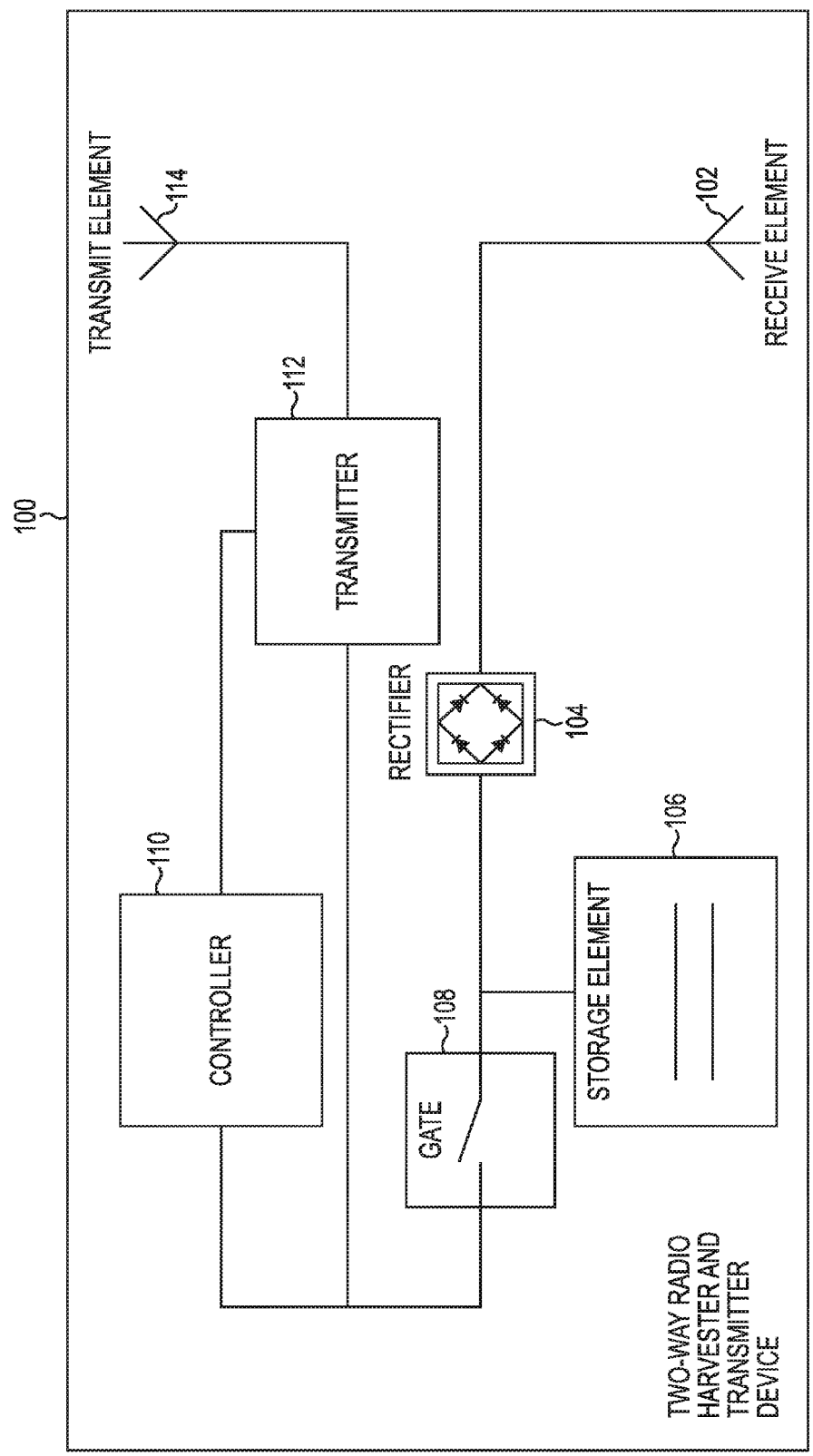
FIG. 1 is an example of a diagram of a two-way radio harvester and transmitter device according to an embodiment of the present disclosure.

A two-way radio harvester and transmitter according to embodiments of the present disclosure can utilize an electromagnetic field to harvest energy to power a data transmission to a receiving device. In some examples, the auxiliary data transmitted can be temperature, GPS coordinates, and/or vital sign data for the emergency personnel, among other useful data that can be passed on an auxiliary channel.

In various embodiments, a two-way radio harvester can send data to the receiving device by harvesting and converting a signal into direct current (DC) power to power the data transmission. In some examples, the two-way radio harvester and transmitter can include: a rectifier connected between a receive element and a storage element to harvest and convert a signal into DC power and store the DC power, a gate coupled to the storage element and a controller to allow the DC power in the storage element to power the controller when the gate reaches a power threshold, and a transmitter connected between the controller and a transmit element to convert data containing information about preselected items synthesized by the controller into radio frequency (RF) signals to be transmitted by the transmit element.

Devices, methods, systems, and computer-readable media for a two-way radio harvester and transmitter are described herein. One or more embodiments include a two-way radio harvester and transmitter comprising a rectifier connected between a receive element and a storage element to harvest and convert a signal into direct current (DC) power and store the DC power, a gate coupled to the storage element and a controller to allow the DC power in the storage element to power the controller when the gate reaches a power threshold and closes, and a transmitter connected between the controller and a transmit element to convert data containing information about preselected items by the controller into RF signals to be transmitted by the transmit element.

The two-way radio harvester and transmitter device embodiments described herein can be utilized, for example, in a system for transmitting and receiving information. In emergency situations many emergency personnel carry a two-way radio for communication. Sometimes two-way radios are not able to communicate reliably from one two-way radio user to another.

The two-way radio harvester and transmitter device allows the two-way radio to continue transmitting information even when communication on the main channel is ineffective. In some embodiments, the two-way radio harvester and transmitter transmits the information on a different frequency band (auxiliary channel) than the two-way radio main communications transmit on (main channel).

This allows the information to be passed even if the two-way radio main channel communication link is down. Additionally, the two-way radio harvester and transmitter does not need a power source because it is powered by signals from the two-way radio.

In some examples, the two-way radio harvester and transmitter uses the two-way radio as a trigger so that it only transmits information when the two-way radio is activated to transmit on the main channel. This and other concepts will be discussed in more detail below.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit corresponds to the drawing figure number and the remaining digits identify an element or component in the drawing. Similar elements or components between different figures may be identified by the use of similar remaining digits.

As used herein, "a" or "a number of" something can refer to one or more such things. For example, "a number of devices" can refer to one or more devices. Additionally, the designator "N", as used herein, particularly with respect to reference numerals in the drawings, indicates that a number of the particular feature so designated can be included with a number of embodiments of the present disclosure.

FIG. 1 is an example of a diagram of a two-way radio harvester and transmitter device. As used herein, the two-way radio harvester and transmitter device 100 can be utilized to transmit auxiliary information. In some examples, the auxiliary information may include temperature data, global positioning system (GPS) coordinates, and/or vital signs data or other suitable data that should be shared between the user of the two-radio and a receiver of the auxiliary communication data.

The two-way radio harvester and transmitter device 100 described in FIG. 1 includes a rectifier 104 connected between a receive element 102 and a storage element 106. The receive element 102 harvests a portion of the signal generated by a two-way radio. In some embodiments, the receive element 102 is tuned at the same frequency as the two-way radio and the receive element 102 harvests a portion of the signal generated by the two-way radio when the two-way radio is transmitting. The harvested signal is energy in the unit of Joules.

The rectifier 104 converts the harvested signal to DC power. The DC power is then stored in the storage element 106. The storage element 106, in some embodiments, includes at least a capacitor, a supercapacitor, a capacitor bank, or a battery.

In FIG. 1, a gate 108 is coupled to the storage element 106 and a controller 110. The gate 108 closes when the storage element 106 reaches the gate's power threshold allowing the DC power to leave the storage element 106, pass through the gate 108, and power the controller 110. The controller 110, in some embodiments, is a field-programmable gate array (FPGA) or a microcontroller, among other suitable controller devices.

A transmitter 112 is connected between the controller 110 and a transmit element 114 to send data, for example, containing information about preselected items, by the controller 110. The transmitter 112 can be powered by the storage element 106 and can convert the data containing information about preselected items, by the controller 110 into RF signals. The RF signals from the transmitter 112 can then be transmitted via the transmit element 114. In some examples, the transmitter 112 includes an amplifier. In some embodiments, the transmit element 114 can take on various antenna topologies including a diploe antenna, monopole antenna, chip antenna, or a planar inverted F antenna (PIFA). Also, the transmit element 114, in some embodiments, can transmit in a WiFi frequency band, an L band frequency band, or an ultra-high frequency (UHF) band. In some examples, the signal harvested by the receive element 102 is a radio frequency (RF) signal, such as that used to communicate information on the main channel. In some examples, the RF signal is used as both an energy source and a gating signal to transmit data on a second frequency channel. This allows the two-way radio harvester and transmitter 100 to operate completely independently of another energy source. It also allows the two-way radio harvester and transmitter 100 to transmit the data via the transmit element 114 once the storage element 106 has stored enough energy to ensure a reliable transmission.

In such embodiments, the primary radio signal can be harvested without significantly affecting the strength of the signal over the main channel. With this reduction, the device can provide an entirely different communication path on which different communication data can be passed.

As shown in the embodiment of FIG. 1, the receive element 102 harvests the signal from a main channel (a first frequency band) and the transmit element 114 uses a second frequency band (an auxiliary channel) to send the data containing information about preselected items. In some embodiments, the receive element 102 is tuned to a frequency band between 300 and 500 MHz to receive two-way radio signals within that frequency range that are transmitted by the two-way radio device. In some embodiments, the receive element 102 can be tuned to frequency bands including citizen's, family radio service (FRS), general mobile radio service (GMRS), multi-use radio service (MURS), broadband radio service (BRS), UHF citizen's band (CB), and amateur radio service band.

In some examples, the gate 108 switches from an open condition to a closed condition depending on a voltage signal. The voltage signal is dictated by the power threshold of the gate 108. The power threshold is dependent on power level and time needed to send the data containing information about preselected items by the controller 110.

In some examples, the power threshold of the gate 108 is static. Therefore, data will be transmitted whenever the storage element 106 reaches the power threshold of the gate 108. A static power threshold of the gate 108 could be implemented when the data size is constant, for example, because the power level and time needed to transmit that data size will remain the same or be within a predetermined tolerance from a predetermined power level and/or time.

In other embodiments, the power threshold of the gate 108 is controlled by the controller 110. The controller 110 can set and/or adjust the power threshold of the gate 108 based on the power level and time needed to transmit the data.

Therefore, data will be transmitted when the storage element 106 reaches the power threshold of the gate 108 set by the controller 110 based on the size of the data to be transmitted. Further, data being transmitted can be sent as soon as the power needed to transmit the data is in storage instead of delaying the data transmission to allow the power to reach a static power threshold that may be more power than needed for that particular data transmission.

This can be accomplished, for example, by the controller having a software or hardware mechanism to calculate the power level needed or the time needed based upon information about the type of information to be sent (e.g., the length of time needed to send the information or each portion of the information to be sent. the power level of the signal to be sent, etc.). In this manner, the controller can adjust the amount of power to be stored or can trigger the sending of information once a threshold power level is reached based on a calculated amount of power that is estimated to be needed.

In some embodiments, the two-way radio harvester and transmitter 100 uses a two-way radio as a trigger so that the two-way radio harvester and transmitter 100 only transmits data when the two-way radio is activated to transmit. This can, for example, be due to the two-way radio harvester and transmitter 100 harvesting energy from the two-way radio when the two-way radio is transmitting. In such am embodiment, when the two-way radio harvester and transmitter 100 harvests and stores enough energy to make a successful transmission the two-way radio harvester and transmitter 100 will transmit the data, while the two-way radio is transmitting.

In some examples, two-way radios can be used along with a two-way radio harvester and transmitter 100 to pass auxiliary information, powered by signals from the two-way radio, along with the audio being transmitted by the two-way radio. This can allow the two-way radio harvester and transmitter to be a smaller device by eliminating the need for power from a power source in the two-way radio harvester and transmitter 100 for transmitting the auxiliary information.

Figure 2:
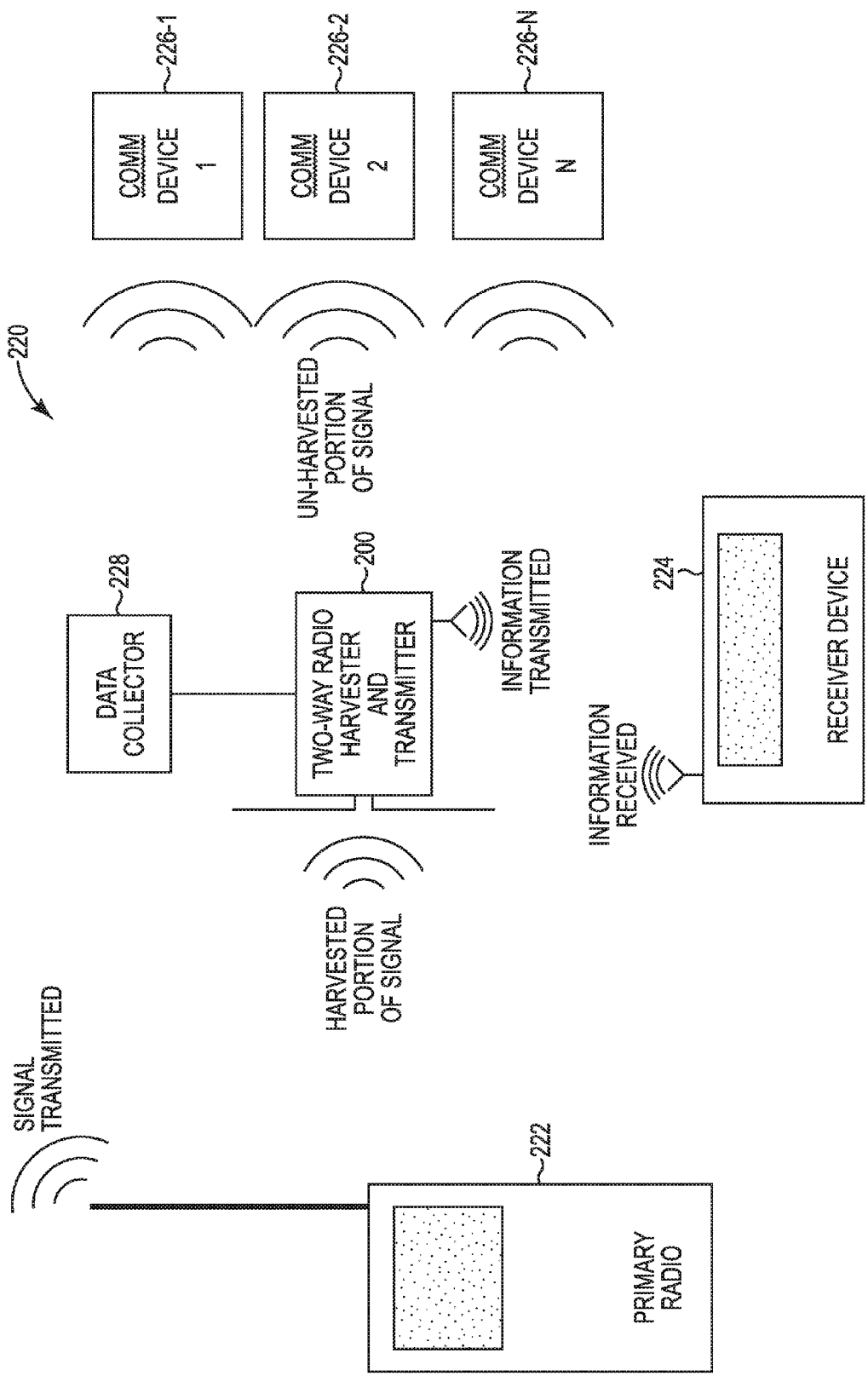
FIG. 2 is an example of a system including a two-way radio harvester and transmitter device according to an embodiment of the present disclosure.

FIG. 2 is an example of a system including a two-way radio harvester and transmitter device consistent with one or more embodiments of the present disclosure. The system 220 can be utilized to harvest a signal, convert the signal to power, send data using the power, and receive the data via a receiver device 224. In some embodiments, the system includes a data collector device 228 to gather the data that will be sent to the receiver 224.

In FIG. 2 a primary radio 222 creates a signal. The two-way radio harvester and transmitter 200 harvests a portion of the signal. The harvested portion of the signal is converted to DC power by the two-way radio harvester and transmitter 200. The power is then used by the two-way radio harvester and transmitter 200 to send information gathered by the data collector 228 to the receiver device 224. The un-harvested portion of the signal is received by a number of communication devices 226-1, ..., 226-N.

The primary radio 222 and the number of communication devices 226-1, ..., 226-N, in some embodiments, are two-way radios. Where the primary radio 222 transmits RF signals and the communication devices 226-1, ..., 226-N receive RF signals.

In some examples, the transmit element 114 in FIG. 1 of the two-way radio harvester and transmitter 200 and the receiver device 224 use a first frequency band and the primary radio 222 and receive element 102 in FIG. 1 use a second frequency band. The two-way radio harvester and transmitter 200, in some embodiments, sends the information to the receiver device 224 once the storage element 106 in FIG. 1 has stored enough of the DC power to make a reliable transmission. In some examples, the data collector device 228 is a temperature sensor, global positioning system (GPS), or vital signs sensor, which can include a power source or can be powered by the storage element 106 in FIG. 1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A two-way radio harvester and transmitter, comprising:
    a rectifier connected between a receive element and a storage element to harvest and convert a signal received by the rectifier into direct current (DC) power and store the DC power in the storage element;
    a gate coupled to the storage element;
    a controller to allow the DC power in the storage element to direct at least some of the stored power to the controller when the gate reaches a power threshold and closes, wherein the power threshold is dependent on at least power level and time needed to send data containing information about preselected items by the controller; and
    a transmitter connected between the controller and a transmit element to convert the data containing information about preselected items by the controller into radio frequency (RF) signals to be transmitted by the transmit element.

2. The two-way radio harvester and transmitter of claim 1, wherein a radio frequency (RF) signal is harvested by the receive element.

3. The two-way radio harvester and transmitter of claim 1, wherein the gate switches on a voltage signal.

4. The two-way radio harvester and transmitter of claim 1, wherein the information synthesized by the controller includes at least one of: temperature, global position system (GPS), or vital signs data.

5. The two-way radio harvester and transmitter of claim 1, wherein the receive element uses a first frequency band to harvest the signal and the transmit element uses a second frequency band to send the data containing information about preselected items.

6. The two-way radio harvester and transmitter of claim 1, wherein the storage element includes at least one of: a supercapacitor, an ultracapacitor, a capacitor bank, or a battery.

7. The two-way radio harvester and transmitter of claim 1, wherein the controller is a field-programmable gate array (FPGA) or a microcontroller.

8. The two-way radio harvester and transmitter of claim 1, wherein the transmitter includes an amplifier.

9. The two-way radio harvester and transmitter of claim 1, wherein the transmit antenna is a dipole antenna, monopole antenna, chip antenna, or a planar inverted F antenna (PIFA).

10. The two-way radio harvester and transmitter of claim 1, wherein the transmit antenna transmits in a WiFi frequency band, an L band frequency band, or an ultra-high frequency (UHF) band.

11. The two-way radio harvester and transmitter of claim 1, wherein the receive element is tuned in to a frequency band between 300 and 500 MHz to receive two-way radio signals.

12. The system of claim 1, wherein the transmit element and the receiver device use a first frequency band and the receive element uses a second frequency band.

13. The system of claim 1, wherein the two-way radio harvester and transmitter sends the information to the receiver device once the storage element has stored enough of the DC power to make a reliable transmission.

14. A system for a two-way radio harvester and transmitter, comprising:
    a two-way radio harvester and transmitter device comprising:
        a rectifier connected between a receive element and a storage element to harvest and convert a signal into direct current (DC) power and store the DC power in the storage element;
        a gate coupled to the storage element and a controller to allow the direct current (DC) power in the storage element to power the controller when the gate reaches a power threshold, wherein the power threshold is dependent on at least power level and time needed to send data containing information about preselected items by the controller;

a transmitter connected between the controller and a transmit element to convert the data containing information about preselected items by the controller into radio frequency (RF) signals to be transmitted by the transmit element; and a receiver device to receive the information from the two-way radio harvester and transmitter device.

15. A system for a two-way radio harvester and transmitter, comprising:

a two-way radio harvester and transmitter device comprising:

a rectifier connected between a receive element and a storage element to harvest and convert a portion of a signal into direct current (DC) power and store the DC power in the storage element;

a gate coupled to the storage element and a controller to allow the direct current (DC) power in the storage element to power the controller when the gate reaches a power threshold, wherein the power threshold is dependent on at least power level and time needed to send data containing information about preselected items by the controller;

a transmitter connected between the controller and a transmit element to convert the data containing information about preselected items by the controller into radio frequency (RF) signals to be transmitted by the transmit element of a two-way radio harvester and transmitter;

a data collector device to gather auxiliary information and to provide the auxiliary information to the controller of the two-way radio harvester and transmitter device to be synthesized; and a receiver device to receive the information from the two-way radio harvester and transmitter device.

16. The system of claim 15, wherein the data collector device is a temperature sensor, global positioning system (GPS), or vital signs sensor.

17. The system of claim 15, wherein the data collector device is powered by the DC power from the storage element.

18. The system of claim 15, wherein the data collector device includes a power source.

19. The system of claim 15, wherein the data collector device is powered by the power source and the DC power from the storage element is used by the two-way radio harvester and transmitter.

* * * * *